L. S. PFOUTS.
FREEZER APPARATUS.
APPLICATION FILED MAR. 21, 1910.

1,191,222.

Patented July 18, 1916.
3 SHEETS—SHEET 1.

Witnesses
Harry O. Rastetter
Geo. B. Pitts

Inventor
Leroy S. Pfouts
By Edward R. Alexander
Attorney.

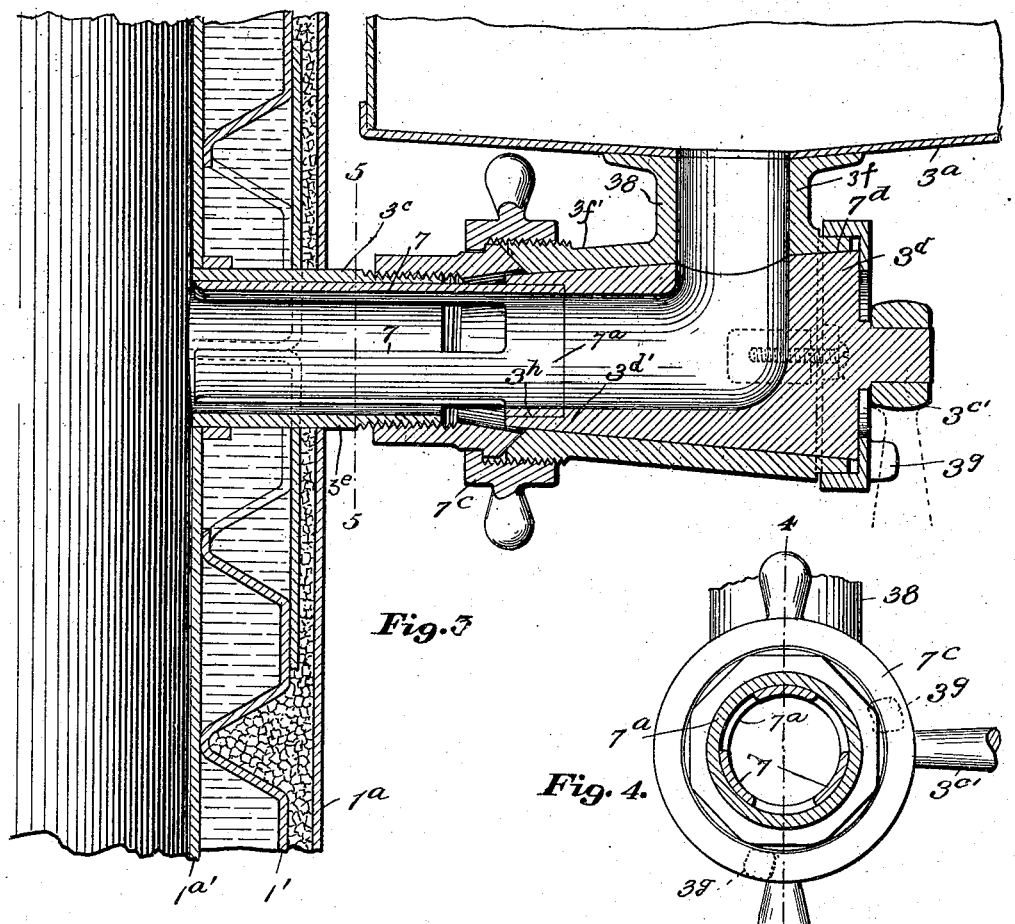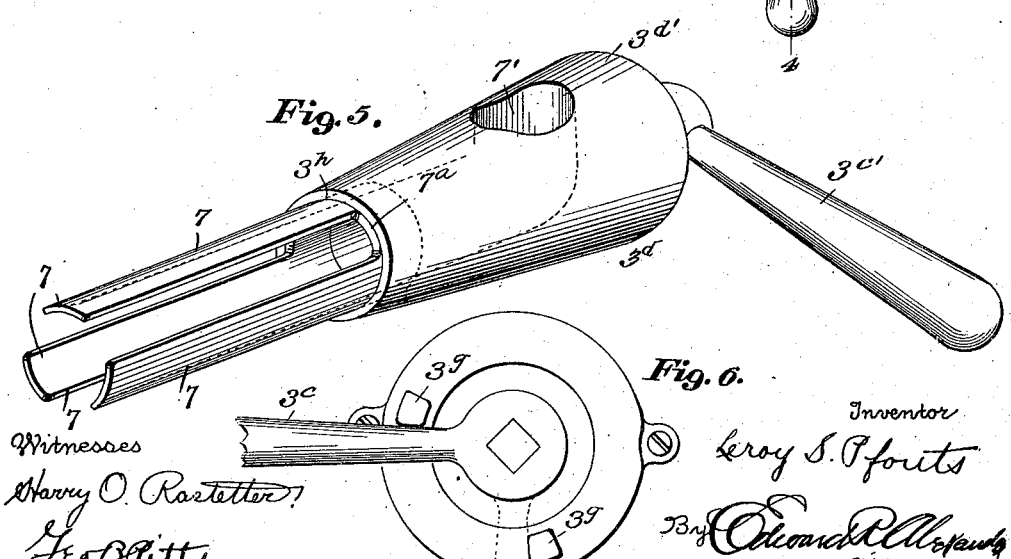

UNITED STATES PATENT OFFICE.

LEROY S. PFOUTS, OF CANTON, OHIO, ASSIGNOR TO THE MILLER PASTEURIZING MACHINE COMPANY, OF CANTON, OHIO, A CORPORATION OF NEW JERSEY.

FREEZER APPARATUS.

1,191,222.  Specification of Letters Patent.  Patented July 18, 1916.

Application filed March 21, 1910. Serial No. 550,644.

*To all whom it may concern:*

Be it known that I, LEROY S. PFOUTS, a citizen of the United States, residing at Canton, in the county of Stark and State of Ohio, have invented certain new and useful Improvements in and Relating to Freezer Apparatus, of which the following is a specification.

This invention relates to apparatus for freezing materials, and particularly to that type of apparatus in which the receptacle for material to be frozen is surrounded by a jacket in and through which a suitable refrigerant is caused to circulate.

For the purposes of illustration I have, in the accompanying drawings, shown and herein described one form of mechanism for freezing materials, embodying my invention.

Figure 1:
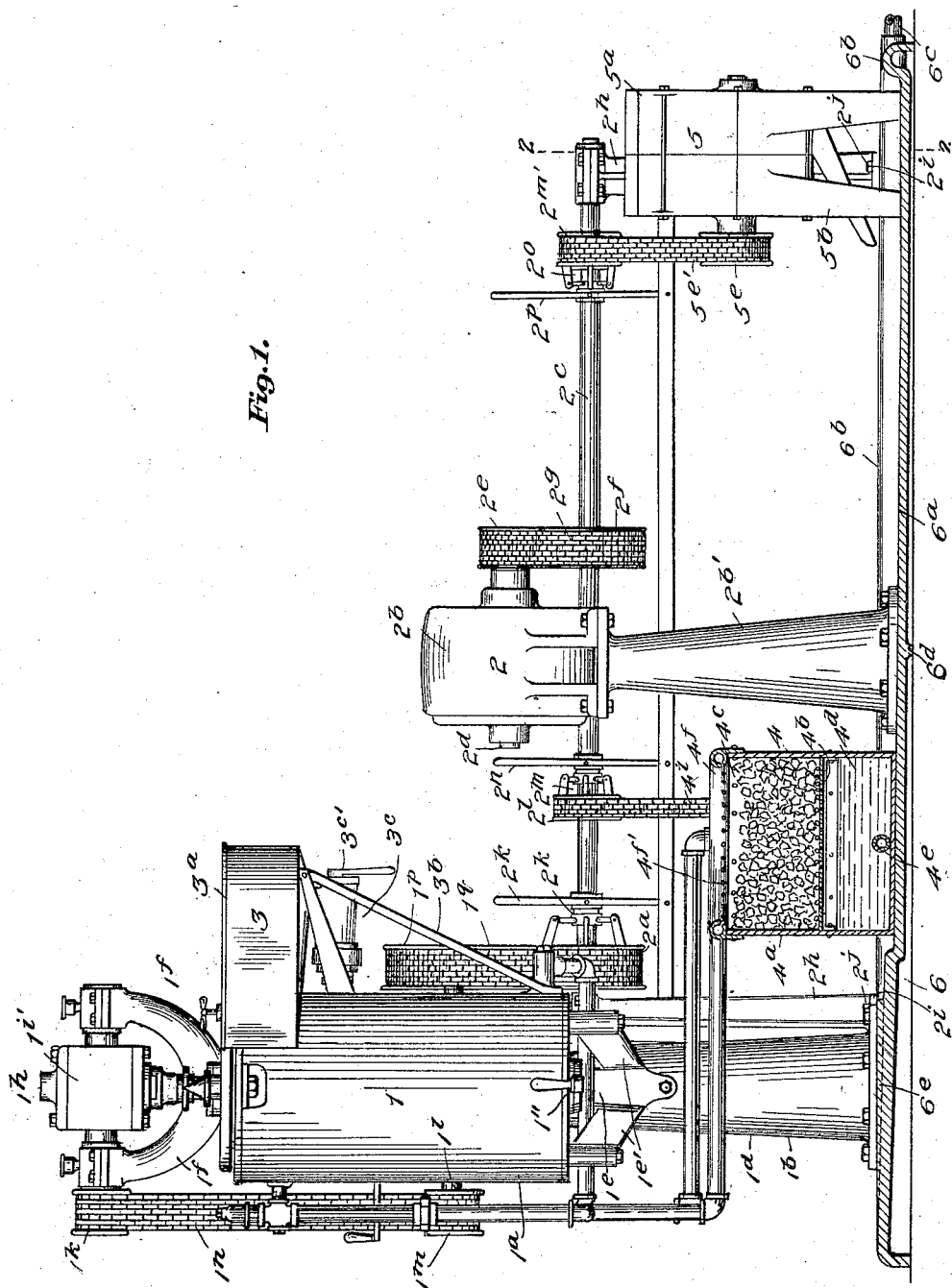
Figure 2:
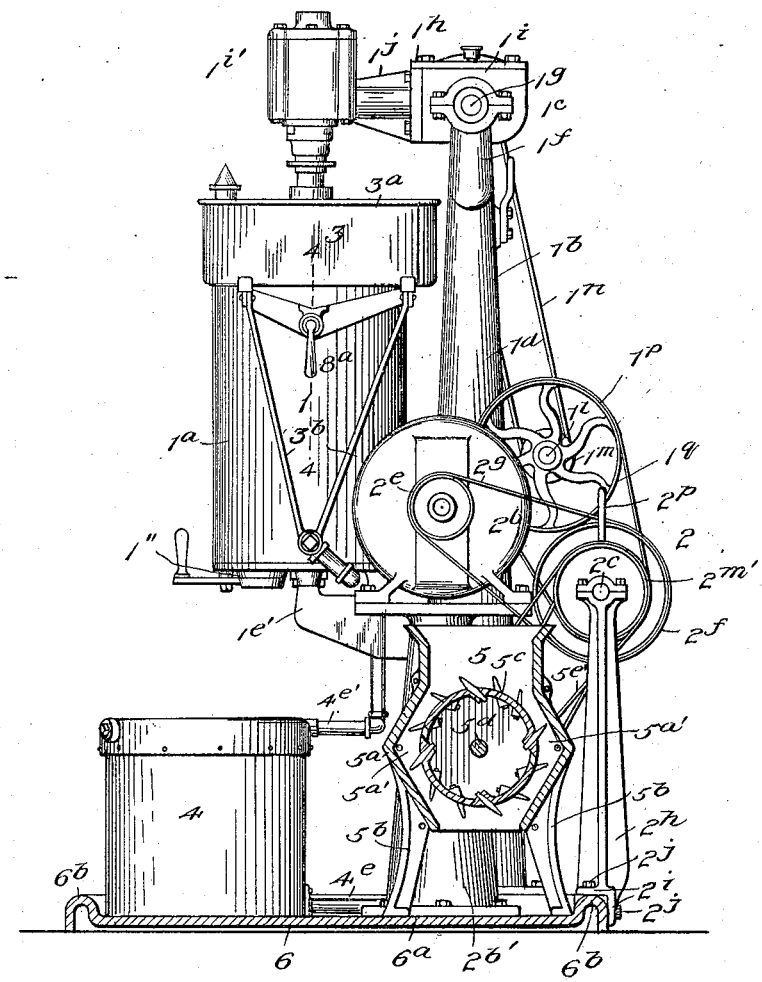

Figure 1 is a view, partly in section, of a mechanism having a freezer embodying my invention. Fig. 2 is a transverse sectional view on the line 2—2 of Fig. 1. Fig. 3 is a fragmentary longitudinal sectional view through the freezer apparatus and holding tank on the line 4—4 of Figs. 2 and 4. Figs. 5 and 6 are detail views of the valve for controlling the flow of material from the tank to the freezer apparatus.

In the drawings, the groups of mechanisms or apparatus may be referred to as follows: 1 indicates the mechanism for freezing materials; 2 indicates the power and driving mechanism for the freezing mechanism and other mechanisms of the plant; 3 indicates the mixing receptacle and its associated parts; 4 indicates the refrigerating mechanism; and 5 indicates the ice crushing mechanism; 6 indicates a base upon which each of the said mechanisms is supported. This base 6 is preferably of rectangular shape and of a size to support the freezer mechanism and the other apparatus combined therewith in convenient position to permit their individual operation and examination by an attendant. The base 6 rests directly upon a flooring. The upper surface of the base is preferably inclined downwardly from one end toward the other end and also from its opposite longitudinal sides toward the center to form a drain portion $6^a$ to which water or other materials, that fall on the base and become wasted, are conducted. $6^b$ indicates a wall extending along the two longitudinal sides of the base and also along that end adjacent to the drain portion $6^a$. This wall operates to prevent the wasted materials from running off the base onto the flooring. $6^c$ indicates a drain pipe extending through the wall $6^b$ and adapted to carry off the wasted materials from the drain portion $6^a$. $6^e$ indicates a platform arranged adjacent to the freezing mechanism 1. This platform is adapted for receiving the cans into which the frozen materials are discharged. The surface of this platform lies in the same plane as the upper edge of the wall $6^b$, in order that the receiving cans may be easily slid off of the platform. The platform $6^e$ is preferably slightly inclined downwardly toward the drain portion $6^a$ of the base 6.

In the preferred form of the invention the base 6, wall $6^b$ and platform $6^e$ are preferably cast from suitable metal in a single unitary structure. When these parts are formed or constructed in this manner, the wall $6^b$ is cast in the shape of an inverted U, which strengthens the base longitudinally and transversely. The free edge of the U-shaped wall operates as the support for the base 6. The base may also be provided with one or more intermediate supports $6^d$ to assist in supporting and strengthening the base 6 between its ends.

The freezing mechanism 1 comprises a freezer $1^a$ preferably consisting of a cylinder $1^{a'}$ having suitable material-agitating mechanism therein and a refrigerant circulating jacket $1'$ surrounding the cylinder, supporting means $1^b$ for the freezer, and driven devices $1^c$ which are connected with the material-agitating mechanism and preferably mounted upon or carried by the freezer supporting means $1^b$. The supporting means $1^b$ consists of a standard $1^d$, preferably of conical shape, and suitably bolted or secured to the base 6, and a table $1^e$ on which the freezer $1^a$ rests. The table $1^e$ is shown as terminating in a pair of outwardly flaring arms $1^{e'}$, $1^{e'}$. $1''$ indicates a valve for the freezer $1^a$ arranged between and forward of the arms $1^{e'}$. $1^f$, $1^f$, indicate a pair of arms carried by the upper end of the standard $1^d$, and each provided with bearings to receive a shaft $1^g$. $1^h$ indicates a casing comprising two gear boxes $1^i$, $1^{i'}$, connected together by a tubular arm $1^j$. Each of the gear boxes $1^i$, $1^{i'}$, incloses suitable gears for transmitting motion from the shaft $1^g$, through a shaft inclosed in the arm $1^j$ to the material-agitating mechanism which has its rotating members extended into the gear box $1^{i'}$. The gear box $1^i$ is provided with trunnions which are suitably mounted on the shaft $1^g$. The casing $1^h$ may be swung upwardly on the trunnions to permit the removal of the material-agitating mechanism and access to the freezer. $1^k$ indicates a gear or sprocket carried by the shaft $1^g$. $1^l$ indicates a countershaft mounted in bearings carried by the standard $1^d$. $1^m$ indicates a sprocket carried by the countershaft $1^l$ and in line with the sprocket $1^k$. $1^n$ indicates a chain or belt passing over or around the sprockets $1^k$ and $1^m$. Changeable speed gear for changing the speed of the shaft $1^l$ may be provided and connected thereto. $1^p$ indicates another sprocket carried by the shaft $1^l$ over which passes a chain $1^q$. The chain $1^q$ is driven by a suitable sprocket $2^a$ forming part of the power mechanism 2.

The power mechanism comprises a motor $2^b$ and a main shaft $2^c$ extending longitudinally of the base 6. The motor $2^b$ is preferably an electric motor, as shown in the drawing. $2^{b'}$ indicates a standard, preferably of conical shape, upon which the motor $2^b$ rests. The lower end of the standard may be expanded to form a flange through which bolts extend to secure the standard to the base 6. The motor is provided with a driving shaft $2^d$. $2^e$ indicates a sprocket fixed to the shaft $2^d$. $2^f$ indicates a sprocket mounted upon the main shaft $2^c$ and alined with the sprocket $2^e$. $2^g$ indicates a chain or belt extending around the sprockets $2^e$ and $2^f$, whereby motion is transmitted from the motor drive-shaft $2^d$ to the main shaft $2^c$.

$2^h$, $2^h$, indicate a plurality of uprights, provided with suitable bearings for supporting the main shaft $2^c$. These uprights may be formed from angle irons and are preferably mounted upon the U-shaped wall $6^b$ of the base 6 in order that they will be maintained in perfect alinement with each other. The lower end of each upright may be provided with two feet $2^i$, $2^i$, one of which rests upon the upper edge of the wall $6^b$, and the other engages with the side edge of the wall. $2^j$ indicate bolts for securing the feet $2^i$ to the wall $6^b$.

The sprocket $2^a$ is loosely mounted upon the shaft $2^c$ and alined with the sprocket $1^p$ for driving the latter through the chain or belt $1^q$. $2^k$ indicates a clutch device for connecting the sprocket $2^a$ to the shaft $2^c$. $2^{k'}$ indicates a lever for operating the clutch.

$3^a$ indicates the mixing tank for the materials to be frozen. $3^b$, $3^b$, indicate arms for supporting the tank $3^a$ in proper position. $3^c$ indicates a pipe connected at its opposite ends with the tank $3^a$ and with the freezing cylinder. $3^d$ indicates a valve for regulating the discharge of materials from the tank $3^a$. Preferably, the pipe or conduit $3^c$ comprises a member $3^e$ extending horizontally from the freezing cylinder and a member $3^f$ extending at substantially right angles to said horizontal member $3^e$. The horizontal member $3^e$ of the pipe $3^a$ is preferably a relatively short section of piping and its inner end opens into the freezing cylinder as shown. As the holding tank $3^a$ is conveniently arranged in close proximity to the freezer and slightly above the discharge or inner end of the horizontal member $3^e$, the member $3^f$ extends from the outer end of said horizontal member in a vertical direction.

As shown in the drawings, the vertical member $3^f$ is provided with an angle member $3^{f'}$ which forms the elbow for the conduit members $3^e$ and $3^f$. At the elbow connection between the conduit members an opening $7^d$ is formed to accommodate the valve $3^d$. $7^c$ indicates a coupling for connecting the adjoining ends of the conduit members together. This coupling member operates in a well known manner. The valve $3^d$ preferably comprises a conical shaped device $3^{d'}$ which rotatably fits the inner conical walls of the conduit $3^e$. 7 indicates a device movably mounted in said horizontal member $3^e$. The device 7, when operated, serves to cut or break away any material that congeals in the conduit member $3^e$ or the inlet opening into the cylinder $1^{a'}$. The device 7 preferably comprises a plate extending longitudinally of the conduit member $3^e$. I may provide three plates 7 and space them apart as shown in the drawings. The plates 7 are preferably secured to and operated by the valve device $3^{d'}$. The valve is formed with a duct $7'$.

The refrigerating apparatus 4 includes a brine cooler $4^a$. $4^b$ indicates a perforated support or partition, dividing the cooler $4^a$ into an upper compartment $4^c$ for crushed ice over which the brine or cooling medium is sprayed, and a lower compartment $4^d$ to receive the brine after it has percolated through the ice.

$4^e$, $4^{e'}$, indicate the circulating pipes for the cooling medium. The pipe $4^e$ leads from the lower compartment $4^d$ of the brine cooler to the inlet opening of the circulating jacket of the freezer, while the pipe $4^{e'}$ leads from the discharge opening of the circulating jacket of the freezer to the ice compartment $4^c$ of the brine cooler.

$4^f$ indicates a spray pipe surrounding the upper end of ice tank $4^c$ and formed with a series of openings or jets $4^{f'}$ arranged to direct the cooling medium downwardly and toward the center of the ice tank.

A suitable pump (not shown) may be interposed in the pipe $4^e$ leading from the compartment $4^d$ of the cooler for causing a circulation of the cooling medium through the pipes 4ᵉ and the jacket of the freezer 1ᵃ. The portion of the pipe 4ᵉ which is arranged within the compartment 4ᵈ is perforated in order that the cooling medium may be screened before it passes into the circulating pipes.

2ˡ indicates a sprocket loosely mounted upon the main shaft 2ᶜ and alined with the sprocket mounted upon the driving shaft for the pump.

4ⁱ indicates a chain passing around the sprocket 2′ and the sprocket on the pump driving shaft, whereby motion is transmitted from the main shaft 2ᶜ to the pump.

2ᵐ indicates a clutch mechanism for connecting the sprocket 2ˡ to and disconnecting it from the shaft 2ᶜ.

2ⁿ indicates a lever for operating the clutch 2ᵐ.

The ice crushing mechanism 5 comprises a casing 5ᵃ mounted on legs 5ᵇ, and a rotary crusher 5ᶜ within the casing. The legs 5ᵇ may be secured in a suitable manner to the base 6. The casing 5ᵃ is open at its upper and lower ends to form an inlet for the ice and an outlet for its discharge after being crushed. The crusher 5ᶜ is mounted upon a shaft 5ᵈ which has bearings in opposite walls of the casing. The coöperating sides of the casing 5ᵃ are preferably V-shaped to form an enlarged portion or pocket 5ᵃ′ between the inlet and discharge openings for the ice. This form of construction facilitates the crushing of the ice. After the ice has been partially crushed between the crusher 5ᶜ and one inclined wall of the casing 5ᵃ, it enters the pocket 5ᵃ′ where it is slightly agitated or stirred before it passes downwardly through the casing for further crushing. 5ᵉ indicates a gear or sprocket wheel carried by the shaft 5ᵈ. 2ᵐ′ indicates a sprocket loosely mounted upon the main shaft 2ᶜ and adapted to be connected to and disconnected therefrom by a clutch 2ᵒ. 5ᵉ′ indicates a gear chain passing over the sprockets 5ᵉ and 2ᵐ′ for transmitting motion to the crushing mechanism from the power mechanism 2. 2ᵖ indicates a lever for operating the clutch 2ᵒ.

In the operation of the plant, the motor 2ᵇ is started to set the main shaft 2ᶜ in operation. From the main shaft motion may be transmitted to the ice crushing mechanism 5, the pump of the refrigerating mechanism 4, and the devices 1ᶜ for propelling the agitating means of the freezer.

It will be understood that the ice crusher mechanism is arranged at or near the drain portion 6ᵃ so that the water resulting from the melting of the ice may flow directly to the drain portion.

My invention is particularly applicable to that type of freezing apparatus having a jacket for the circulation of a refrigerant and a material supply pipe leading through such jacket to the freezing cylinder. In such form of construction some of the material in the cylinder may be dashed or forced by the material agitating mechanism within the cylinder up into the inlet opening or discharge end of the supply pipe 3ᵉ. Such material or any material which does not flow into the cylinder, may quickly congeal in the conduit or opening under the cooling effects of the refrigerant in the jacket and close or clog the pipe 3ᵉ; as a result, the cylinder cannot be re-filled until the pipe 3ᵉ or inlet opening for the cylinder is re-opened. This operation has heretofore usually been accomplished by allowing the congealed or frozen material in the pipe 3ᵉ to melt away.

From the foregoing description it will be seen that I provide a device which is adapted, by movement in the inlet opening or discharge end of the pipe 3ᵉ, to cut or break away any material which may close such passageway and thus permit the re-filling of the freezing cylinder whenever desired and without waiting for such material to melt. It will be understood that the devices 7 extend longitudinally of that portion of the supply pipe 3ᵉ which extends through the refrigerant conveying jacket, so as to operate efficiently in cutting away all material which may be affected by the refrigerant. As the devices 7 are relatively thin and fit close against the inner walls of the pipe 3ᵉ, they operate in an effective manner to cut away any material therewithin without obstructing to any great extent the opening through the pipe. The devices 7 do not, therefore, have to be removed to permit the material to flow from the tank 3 to cylinder 1ᵃ, nor does the conduit 3ᵉ have to be opened to clean out the congealed material.

To those skilled in the art of making apparatus of the class described, many alterations in construction and widely differing embodiments and applications of my invention will suggest themselves, without departing from the spirit and scope thereof. My disclosures and the description herein are purely illustrative, and are not intended to be in any sense limiting.

I claim—

1. In a freezer mechanism, the combination of a freezing cylinder, a tank for holding the material to be frozen, a conduit leading from said tank to said freezing cylinder, and a valve mechanism movably mounted in said conduit and provided with a device arranged to be moved therein by said valve mechanism.

2. In a freezer mechanism, the combination of a freezing cylinder, a tank for holding the material to be frozen, a conduit leading from said tank to said freezing cylinder, and a valve mechanism rotatably mounted in said conduit and provided with a plate extending longitudinally of said conduit and arranged to be revolved therein by said valve.

3. In a freezer mechanism, the combination of a freezing cylinder, a tank for holding the material to be frozen, a conduit leading from said tank to said freezing cylinder, and a valve mechanism rotatably mounted in said conduit and provided with a plate extending longitudinally of said conduit and arranged to be revolved therein by said valve, the said plate being arc-shaped in cross section and closely fitting the inner wall of said conduit.

4. The combination with a freezing mechanism having a cylinder and a tank for holding the material to be frozen, of a conduit leading from said tank to said cylinder comprising a member extending horizontally from said cylinder and a member extending at right angles to said horizontal member, a valve arranged in the elbow between said horizontal and vertical members for controlling the flow of material through said conduit, and a series of plates connected with said valve extending longitudinally of said horizontal member of the conduit and closely fitting its inner walls and arranged to be revolved by said valve.

5. The combination with a freezing mechanism having a cylinder and a tank for holding the material to be frozen, of a conduit leading from said tank to said cylinder comprising a member extending horizontally from said cylinder and a member extending at right angles to said horizontal member, a valve arranged in the elbow between said horizontal and vertical members for controlling the flow of material through said conduit, and a series of plates connected with said valve extending longitudinally of said horizontal member of the conduit and closely fitting its inner walls and arranged to be revolved by said valve, the free ends of said plates extending approximately to the inner end of said horizontal member of the conduit.

6. In mechanism of the class described, the combination of a freezer mechanism having a freezing cylinder, a tank for holding the material to be frozen, a conduit leading from said tank to said freezing cylinder and including a horizontal member the inner end of which opens into said freezing cylinder and a member extending at right angles to said horizontal member, and a rotary valve arranged in the elbow connecting said members together, for controlling the flow of material through said conduit, said valve being provided with a series of spaced plates of arc shape in cross section, extending longitudinally of said horizontal member to a point adjacent to the inner end thereof.

7. In mechanism of the class described, the combination of a freezer mechanism having a freezing cylinder, a tank for holding the material to be frozen, a conduit leading from said tank to said freezing cylinder and including a horizontal member the inner end of which opens into said freezing cylinder and a member extending at right angles to said horizontal member, a rotary valve arranged in the elbow connecting said members together, for controlling the flow of material through said conduit, said valve being provided at its inner end with an annular recess, and a ring fixed in said recess and provided with a series of plates extending longitudinally of said horizontal member, the said plates being arc shaped in cross section and closely fitting the inner walls of said horizontal member, and arranged to be rotated by said valve when the latter is opened and closed.

8. In apparatus of the character described, a cylinder having a material inlet opening and a jacket through which a cooling agent circulates, a conduit leading through said jacket to said opening, a device mounted to move in said opening to cut away material congealed or clogged therein, and means for operating said device.

9. In apparatus of the character described, a cylinder having a material inlet opening and a jacket through which a cooling agent circulates, a conduit leading through said jacket to said opening, a device arranged to move in said opening and in close proximity to the wall of said conduit to cut away material congealed or clogged in the opening, and means for operating said device.

10. In apparatus of the character described, a cylinder having a material inlet opening and a jacket through which a cooling agent circulates, a conduit leading through said jacket to said opening, a valve for controlling the flow of material through said conduit, a device movably mounted in said opening for cutting away material congealed or clogged therein, the said device being connected to and movable with said valve, and means for operating said valve.

11. In apparatus of the character described, the combination of a cylinder having a material inlet opening and a jacket through which a cooling agent circulates, a conduit leading through said jacket to said opening, a valve for controlling the flow of material through said conduit, a device movably mounted in said conduit between the opening in the cylinder and the valve and connected to the latter to move therewith, and means for operating said valve.

12. In apparatus of the character described, the combination of a cylinder having a material inlet opening and a jacket through which a cooling agent circulates, a conduit leading through said jacket to said opening, a movable device extending longitudinally of said conduit and having its free end terminating approximately at said opening, the said device being arranged close to the wall of the conduit, whereby it operates to cut away material in the opening, and means for operating said device.

13. In apparatus of the character described, the combination of a cylinder having a material inlet opening, formed in its side wall, a conduit leading to said opening, a movable device extending longitudinally of said conduit and having its free end terminating approximately at said opening, the said device being arranged close to the wall of the conduit, whereby it operates to cut away material in an opening, and means for operating the said device.

14. In apparatus of the character described, the combination of a cylinder having a material inlet opening, a conduit leading to said opening, a movable device extending longitudinally of said conduit and having its free end terminating approximately at said opening, the said device being arranged close to the wall of the conduit, whereby it operates to cut away material in the opening, and means arranged external to said cylinder and conduit for operating said device.

15. The combination with a freezing cylinder having an inlet opening and a tank for holding material to be frozen, of a conduit leading from said tank to the inlet opening in said cylinder, a valve arranged in said conduit intermediate the ends thereof for controlling the flow of material from said tank to said cylinder, and a movable device in said conduit arranged between said valve and the inlet opening for said cylinder for cutting away material congealed or clogged in the opening.

16. The combination with a freezing cylinder having an inlet opening and a jacket or chamber for a refrigerating medium, and a tank for holding material to be frozen, of a conduit leading from said tank to the inlet opening for the cylinder and extending through said jacket, a device for cutting away material clogged in the inlet opening, said device being movably mounted in that portion of said conduit which extends through the jacket, and means for operating said device.

17. The combination with a freezing cylinder having an inlet opening and a jacket or chamber for a refrigerating medium, and a tank for holding material to be frozen, of a conduit leading from said tank to the inlet opening for the cylinder and extending through said jacket, a device for cutting away material clogged in the inlet opening, said device being movably mounted in and extending longitudinally of that portion of said conduit which extends through the jacket and arranged in close proximity to the walls of the conduit to avoid obstructing the passage therethrough, and means for operating said device.

18. In a freezer mechanism, the combination of a freezing cylinder, having a material inlet opening and a jacket through which a cooling agent circulates, a material supply conduit leading through said jacket to said opening for supplying material to said cylinder, and means mounted in said conduit for controlling the flow of material therethrough and for cutting away any material that congeals in the inlet opening of said cylinder.

19. The combination of a freezing cylinder having an inlet opening and a jacket through which a cooling agent circulates, a material supply conduit leading through said jacket to the inlet opening for said cylinder, said conduit including a horizontal member the inner end of which opens into said freezing cylinder and a member extending at right angles to said horizontal member, and means movably mounted in the elbow connecting said members together for controlling the flow of material through said conduit and for cutting away any material that congeals in said conduit.

In testimony whereof I affix my signature, in the presence of two witnesses.

LEROY S. PFOUTS.

Witnesses:
WILLIAM H. MILLER,
IRENE LUTZ.

It is hereby certified that in Letters Patent No. 1,191,222, granted July 18, 1916, upon the application of Leroy S. Pfouts, of Canton, Ohio, for an improvement in "Freezer Apparatus," errors appear in the printed specification requiring correction as follows: Page 1, line 26, after the period insert the sentence *Fig. 4 is a section on the line 5—5 of Fig. 3.;* page 2, line 105, strike out the period and insert the following:

*which forms a part of the conduit 3ᶜ when the valve is opened, as shown in Fig. 4, but operates to close the conduit when rotated a quarter turn, by a hand lever 3ᶜ'. 3ᵍ indicates stops for limiting the movements of the lever 3ᶜ'.*

*The plates or arms 7 are preferably arc-shaped in cross-section in order to closely fit the inner walls of the pipe member 3ᶜ. The plates preferably extend approximately to the inner end of the pipe member 3ᶜ. The inner ends of said plates 7 may be formed integral with a ring 7ᵃ which fits an annular recess 3ʰ formed in the walls of the valve device 3ᵈ'. The ring 7ᵃ may be fixed to said valve device 3ᵈ' in any well-known manner.;* and that the said Letters Patent should be read with these corrections therein that the same may conform to the record of the case in the Patent Office.

Signed and sealed this 22d day of August, A. D., 1916.

[SEAL.]

F. W. H. CLAY,
*Acting Commissioner of Patents.*

Cl. 137—21.